United States Patent
Redzic et al.

(10) Patent No.: US 9,443,281 B2
(45) Date of Patent: Sep. 13, 2016

(54) PIXEL-BASED WARPING AND SCALING ACCELERATOR

(71) Applicant: Intel Corporation, Santa Clara, CA (US)

(72) Inventors: Dmitar Redzic, Belgrade (RS); Aleksandar Beric, Eindhoven (NL); Edwin Van Dalen, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/317,234

(22) Filed: Jun. 27, 2014

(65) Prior Publication Data
US 2015/0379666 A1    Dec. 31, 2015

(51) Int. Cl.
*G06T 1/20*     (2006.01)
*G06T 3/40*     (2006.01)
*G06T 3/00*     (2006.01)

(52) U.S. Cl.
CPC .............. *G06T 1/20* (2013.01); *G06T 3/0093* (2013.01); *G06T 3/4007* (2013.01); *G06T 2200/28* (2013.01)

(58) Field of Classification Search
CPC ..... G06T 3/4007; G06T 15/80; G06T 3/403; G06T 5/001; G06T 11/001; G06T 15/04; G06T 11/203; G06T 15/005; G06T 15/83; G06T 15/87; G06T 2210/44; G06T 3/0093; G09G 2340/125; G09G 5/363; G06F 17/175; G06F 17/17
See application file for complete search history.

(56) References Cited

U.S. PATENT DOCUMENTS

| | | | | |
|---|---|---|---|---|
| 4,864,629 A * | 9/1989 | Deering | ............... | G06K 9/6203 365/239 |
| 6,215,516 B1 * | 4/2001 | Ma | ............... | G06T 3/0093 345/419 |
| 6,249,289 B1 * | 6/2001 | Arnaud | ............... | G06T 15/005 345/419 |
| 6,947,610 B2 * | 9/2005 | Sun | ............... | G06T 3/00 353/69 |
| 7,519,224 B2 * | 4/2009 | Kang | ............... | G11B 7/0065 369/103 |
| 7,545,391 B2 * | 6/2009 | Le Dinh | ............... | G06T 3/4084 345/660 |
| 8,290,237 B1 * | 10/2012 | Burks | ............... | G06Q 20/042 382/137 |
| 2002/0004421 A1 * | 1/2002 | Itai | ............... | A63F 13/10 463/31 |

(Continued)

*Primary Examiner* — Todd Buttram
(74) *Attorney, Agent, or Firm* — Green, Howard & Mughal LLP

(57) ABSTRACT

Technologies are presented that allow efficient pixel-based image and/or video warping and scaling. An image processing system may include a memory and an accelerator unit communicatively coupled with the memory. The accelerator unit may, based on configuration settings, receive, from a memory, at least a portion of an input image as an array of neighboring four-cornered shapes; and process each shape by: determining locations of an array of output pixels delineated by four corner locations of the shape via linearization; interpolating a value of each pixel of the array of output pixels; and storing the interpolated pixel values in the memory. For warping, the array of neighboring four-cornered shapes may include an array of neighboring distorted tetragons that approximate distortion of the input image, and the interpolated pixel values may represent a warped output image. For scaling, the array of neighboring four-cornered shapes may include an array of neighboring rectangles.

22 Claims, 12 Drawing Sheets

(56) References Cited

U.S. PATENT DOCUMENTS

| | | | | |
|---|---|---|---|---|
| 2005/0157947 A1* | 7/2005 | Kim | ............................ | G06T 3/40 382/298 |
| 2006/0188172 A1* | 8/2006 | Higurashi | ............... | G06T 5/006 382/275 |
| 2006/0233253 A1* | 10/2006 | Shi | ....................... | H04N 19/139 375/240.16 |
| 2007/0122061 A1* | 5/2007 | Sakuta | .................. | G06T 3/4007 382/300 |
| 2008/0143745 A1* | 6/2008 | Jin | ......................... | G06T 3/4038 345/629 |
| 2010/0166297 A1* | 7/2010 | Raymond | ................ | G06T 7/403 382/156 |
| 2012/0294528 A1* | 11/2012 | Li | ........................... | H04N 1/387 382/173 |
| 2013/0243353 A1* | 9/2013 | Kudo | ..................... | G06T 3/4007 382/300 |
| 2015/0262344 A1* | 9/2015 | Stec | ......................... | G06T 5/006 382/275 |

\* cited by examiner

PIXEL-BASED WARPING AND SCALING ACCELERATOR

TECHNICAL FIELD

The technologies described herein generally relate to image and/or video warping and resolution scaling in a computing system.

BACKGROUND

Image and video (e.g., frame) warping includes operations that may change the geometry of an image in order to provide, for example, correction of geometrical distortion, digital/image stabilization, correction of artifacts, etc. Image scaling includes operations that may change the resolution (e.g., width and height) of an image. Image and video warping operations may not be easily handled by a vector processor as warping is a pixel-based operation that may not easily be vectorized. Image scaling may also be difficult for current vector processors. No known solutions provide both pixel-based image/video warping and scaling in an efficient manner.

BRIEF DESCRIPTION OF THE DRAWINGS/FIGURES

Figure 1:
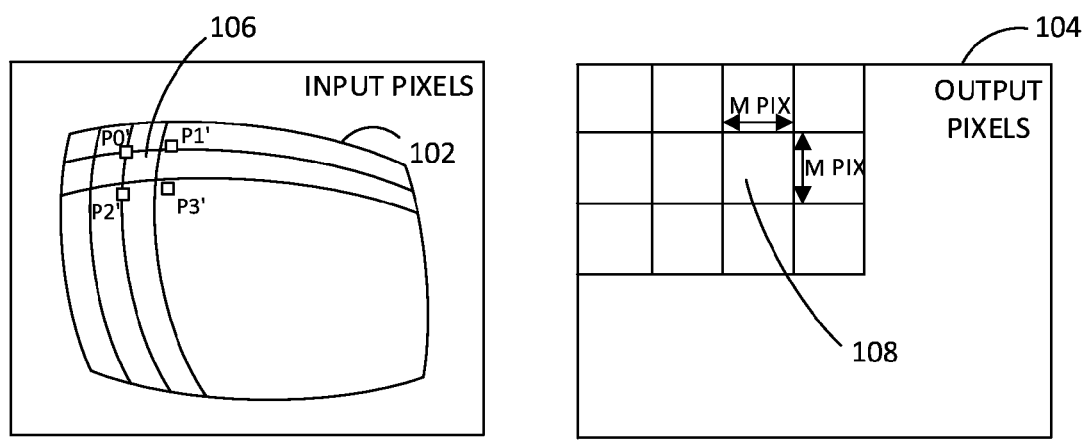
FIG. 1 illustrates example input and output pixel sets of a warping use case, according to an embodiment.

In the drawings, the leftmost digit(s) of a reference number may identify the drawing in which the reference number first appears.

DETAILED DESCRIPTION

Embodiments are now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

In the embodiments presented herein, a customizable application-specific warping/scaling accelerator of an image processing system is described that provides pixel-based image warping and scaling acceleration with efficiency in performance, power, area, flexibility, and implementation.

FIG. 1 illustrates example input and output pixel sets of a warping and/or geometric distortion use case, according to an embodiment. In FIG. 1, a distorted input picture 102 (e.g., an image or video frame), made up of input pixels, may be divided into neighboring distorted tetragons, such as distorted tetragon 106, that approximate the distortion. The distorted input picture 102 may be divided into the neighboring distorted tetragons by a controller, for example, and data defining the neighboring distorted tetragons may be provided to the image warping and scaling accelerator (also referred to herein as "accelerator") for processing. From data within each tetragon, output pixels (e.g., output pixels 104) may be interpolated based on, for example, four coordinates (P0', P1', P2', and P3'). For example, from data within distorted tetragon 106, a corresponding output block 108 may be interpolated. In the example shown in FIG. 1, output block 108 has dimensions M pixels by M pixels. By way of example and not limitation, M may be equal to 64 pixels, for example.

Figure 2:
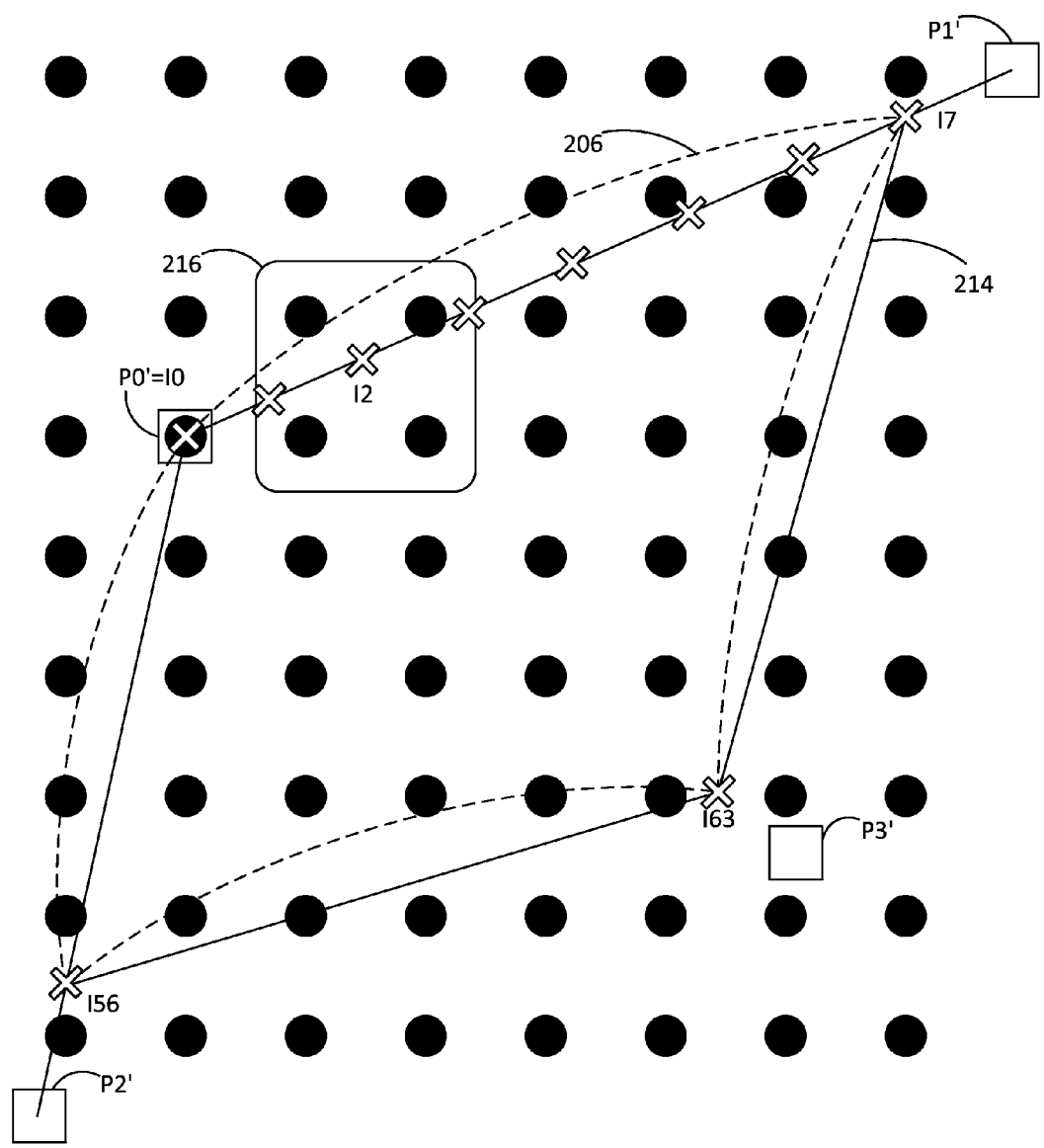
FIG. 2 is a depiction of a warping example showing approximation of an irregular region to a regular region, according to an embodiment.
Figure 3:
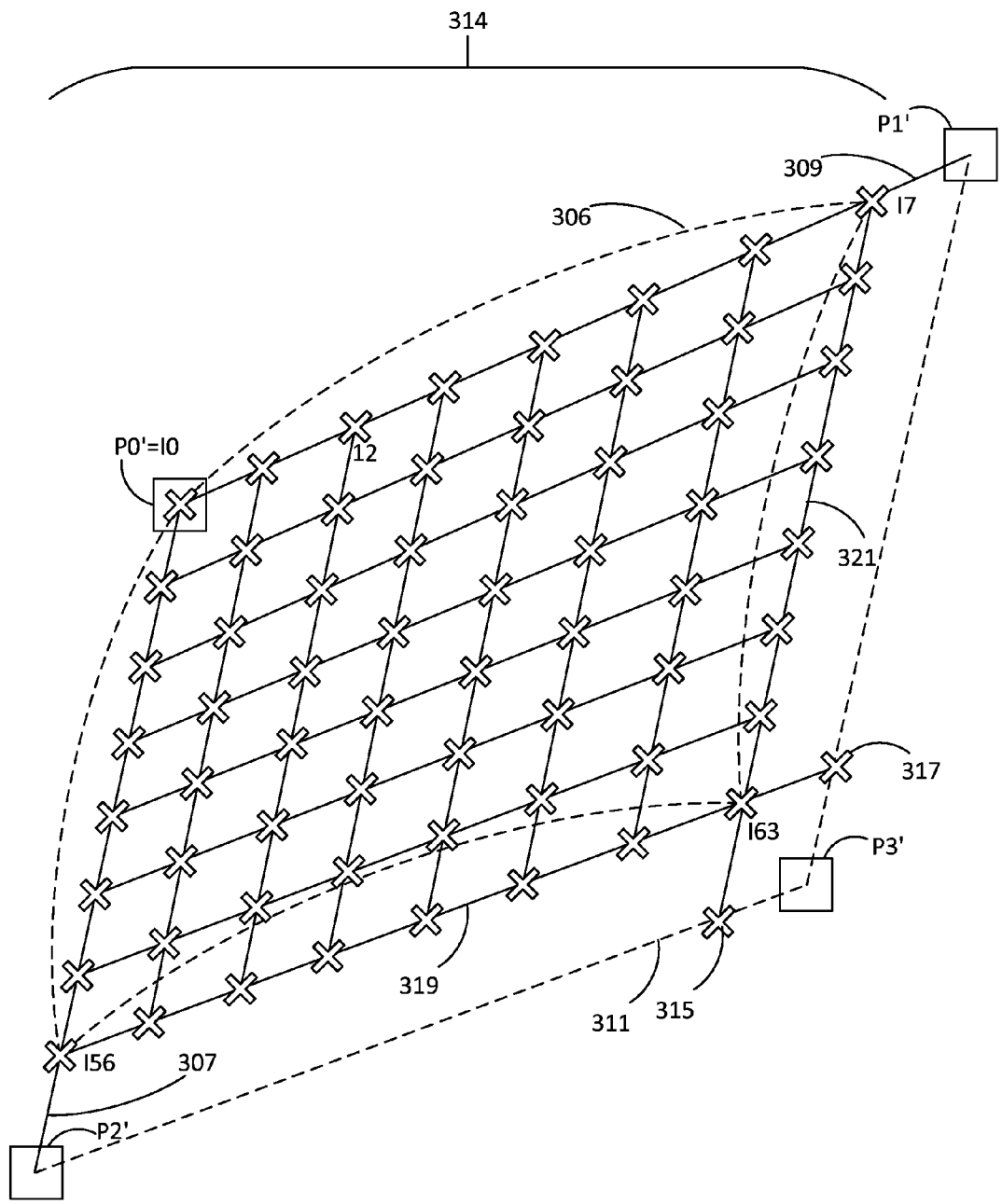
FIG. 3 is a depiction of all interpolated pixels of the regular region of FIG. 2, according to an embodiment.

The warping transformation may be applied to the input distorted tetragons one by one. A piece-wise linearization may be applied to each distorted tetragon, as illustrated in FIGS. 2 and 3. FIG. 2 is a depiction of a warping example showing approximation of an irregular region to a regular region, according to an embodiment. In FIG. 2, a set of output pixels (shown as delineated by shape 214, individually denoted by example X-es) may be computed for a distorted tetragon 206 using coordinates P0', P1', P2', and P3'. Locations of the output pixels may be determined, and the output pixel values may be interpolated. Any appropriate interpolation method may be used, including, for example, nearest neighbor interpolation (e.g., selecting nearest pixel), bi-linear interpolation (e.g., using 2×2 window of pixels and interpolating output pixel), bi-cubic interpolation (e.g., using 3×3 (or larger) window of pixels and selecting center pixel), a look-up table, a poly-phase filter (e.g., with 64, 128, 256, etc., phases) configurable in filter size and filter coefficients, etc. With poly-phase filtering, as an example, two dimensional (2D) filtering may be implemented as two one dimensional (1D) filter passes, one pass being horizontal and one pass being vertical. The interpolation method used may depend on the desired performance of the operation and/or desired image quality. In an embodiment, the interpolation method used may be configurable. In the example of FIG. 2, bilinear interpolation of a pixel I2 is shown using four nearest neighbors (2×2 block of dots surrounded by box 216). As would be understood by one of ordinary skill in the art, the notations of I0, I2, I7, I56, and I63 are example pixel numbers for the examples shown in FIGS. 2 and 3.

In FIG. 2, although only a few of the interpolated pixels are shown (denoted by X-es), the coordinate locations of all of the interpolated pixels are to be determined. By way of example and not limitation, an 8×8 output block is shown being interpolated in FIG. 2. Any size output block may be interpolated in this way. FIG. 3 shows the locations of all of the interpolated pixels of an output block 314 (which includes the X-es at and between locations I0, I7, I56, and I63) for a distorted tetragon 306 based on four coordinates P0', P1', P2', and P3'. The image warping operation is based on (or controlled by) the four coordinates P0', P1', P2', and P3'. Distance between output pixels and the shape of the grid may be controllable based on these coordinates. In an embodiment, settings for the distances between output pixels may be configurable. A more detailed example will be discussed with reference to FIG. 3.

Distorted tetragon 306 of FIG. 3 may be based on, or defined, by the four coordinates P0', P1', P2', and P3'. The four coordinates P0', P1', P2', and P3' are also used to determine the interpolation points for the output pixels. As can be seen in FIG. 3, virtual lines 307, 309, 311, and 313 are defined by points P0' and P2', P0' and P1', P2' and P3', and P1' and P3', respectively. As can be seen in FIG. 3, the tetragon "corners" I0, I7, and I56, which are also locations of determined output pixels, fall on at least one of lines 307 and 309. For the first (top) line of output pixels (along line 309), the first output pixel for distorted tetragon 306 is located at P0' and the coordinates of the remaining output pixels along line 309 are equidistant, with the distances between them calculated (in the Descartes coordinate system) as deltaX=|P1'$_X$−P0'$_X$|/OXDim and deltaY=|P1'$_Y$−P0'$_Y$|/OXDim, where OXDim is a predefined horizontal dimension defining the number of coordinates per horizontal line. Given this definition, the location of output pixel I7 may be said to be located deltaX and deltaY before P1'. The same principle may be applied for the location of the first (left-most) column of output pixels (along line 307), using P0', P2', and predefined vertical dimension OYDim defining the number of coordinates per vertical column. The first coordinate is located at P0' and the coordinates of the remaining output pixels along line 307 are equidistant, with the distances between them calculated (in the Descartes coordinate system) as LeftStepX=|P2'$_X$−P0'$_X$|/OYDim and LeftStepY=|P2'$_Y$−P0'$_Y$|/OYDim. Given this definition, the location of output pixel I56 may be said to be located LeftStepX and LeftStepY before P2'. On the right side of distorted tetragon 306, the position of I63 may be determined by dividing virtual lines 311 and 313 in OXDim and OYDim equidistant sections, respectively, to form arrays of locations similar to the X-es along lines 307 and 309. In FIG. 3, only locations 315 and 317 are shown for ease of discussion, as these locations are closest to P3'. A virtual line 319 from the location closest to P2', which is I56, to location 317 is drawn, as well as a virtual line 321 from the location closet to P1', which is I7, to location 315 is drawn, and the intersection of lines 319 and 321 is the determined location of I63. The same principles may be applied to determine all of the horizontal and vertical lines of output pixels. It should be noted that although the lines of output pixels shown in FIG. 3 appear to be substantially parallel horizontally and vertically, the lines of output pixels are not required to be parallel horizontally or vertically. It should also be noted that OXDim and OYDim may be configurable.

From the discussions of FIGS. 2 and 3, it can be seen that the nature of the image warping and scaling accelerator is pixel-based, as opposed to vector-based. For warping, the input is a tetragon, and the input pixels are not aligned to any vertical column or horizontal row and therefore cannot be treated as part of a same instruction. Vector processors and memories found within them offer access to a row, column, or block of data (e.g., input pixels). The present algorithms may require more complex access patterns which may change during run-time due to their dependency on the tetragon shape. Due to complicated data access patterns, vector processors may not be capable of accelerating such algorithms.

The image warping and scaling accelerator may autonomously process entire rows and columns of an input image or video frame. The processing of an input image or video frame may be configurable. For example, one or more of the following configuration settings may be set:
  Bits Per Pixel—the number of bits to be used to encode a pixel (i.e., bit precision);
  Source Address—the source address of the top left pixel of an input region;
  Source Wrap Address—the address to continue reading from when a specified Source End Address is reached;
  Source End Address—when this address is reached during processing, processing is to continue at the Source Wrap Address;
  Source Stride—the stride to be used when reading the input pixels;
  Output X Dimension (OXDim)—horizontal dimension of an output rectangular block;
  Output Y Dimension (OYDim)—vertical dimension of the output rectangular block;
  Destination Address—destination address of the top left pixel of the output region; and/or
  Destination Stride—stride to be used when storing the output pixels.
Other configuration settings may include, for example:
  Processing Mode (regarding the shape of the input region)
    Scaling (e.g., rectangle-based scaling); and/or
    Warping (e.g., tetragon-based re-shaping);
  dX—distance used to determine horizontal scaling ratio in scaling mode (rX=n/dX, where n is a design constant that may be configurable)
  dY—distance used to determine vertical scaling ratio in scaling mode (rY=n/dY)
  Scanning Mode (regarding the refreshing of the processing region)
    Sliding down; and/or
    Sliding right;
  Interpolation Type
    Nearest Neighbor;
    Bi-Linear;
    Bi-Cubic;
    Look-Up Table; and/or
    Poly-phase filter size and coefficients; and/or
  Performance Point (i.e., how many pixels per clock cycle are produced, which may depend on the resolution of the image or video frame)
    1×1—one pixel per clock cycle;
    2×1—two pixels horizontally and one pixel vertically per clock cycle;
    1×2—one pixel horizontally and two pixels vertically per clock cycle; and/or
    2×2—two pixels horizontally and two pixels vertically per clock cycle.
The configuration settings may be input by a user and stored, for example in configuration registers of the image warping and scaling accelerator. The embodiments are not to be limited to the above-described configuration settings. Other configuration settings and options may also be contemplated. The configuration settings will be discussed in more detail in the descriptions of FIGS. 4-7 that follow.

Figure 4:
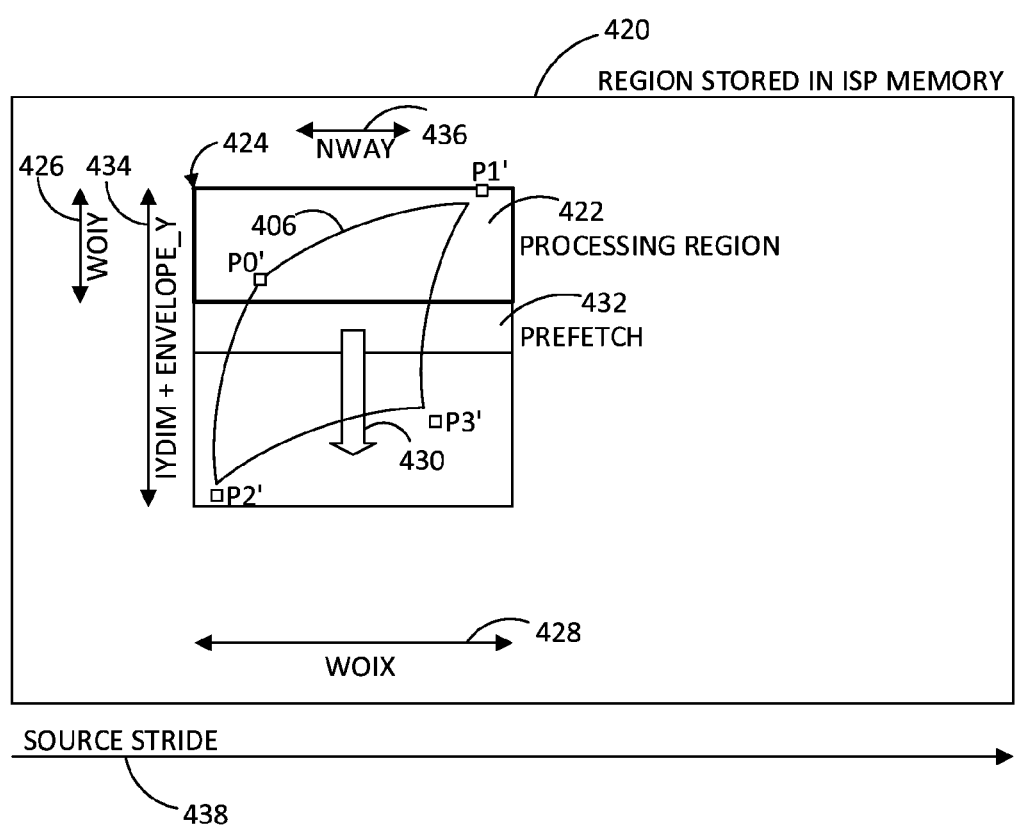
FIG. 4 is a depiction of a "sliding down" scanning mode example of a warping operation, according to an embodiment.
Figure 5:
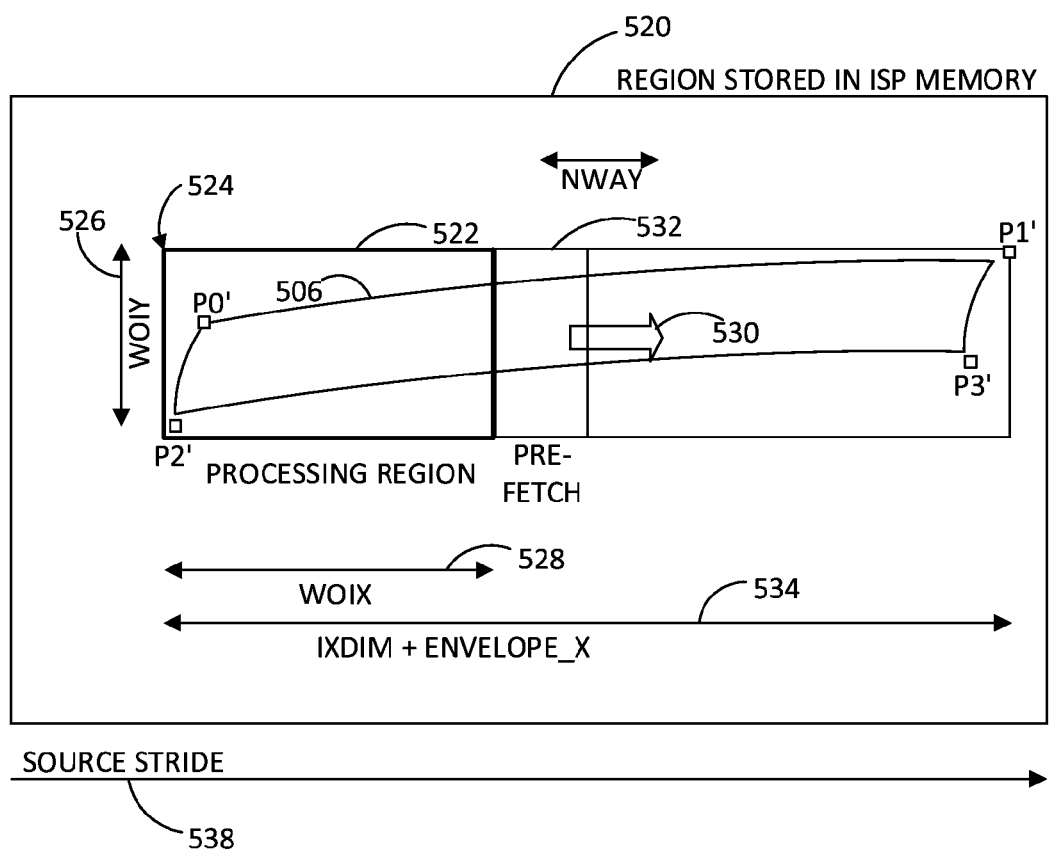
FIG. 5 is a depiction of a "sliding to the right" scanning mode example of a warping operation, according to an embodiment.

FIGS. 4 and 5 depict warping operation examples. FIG. 4 is a depiction of a "sliding down" scanning mode example of a warping operation, according to an embodiment, and FIG. 5 is a depiction of a "sliding right" scanning mode example of a warping operation, according to an embodiment. Which scanning mode is used may depend on the shape and/or size (e.g., height and width) of the shape being processed. The "sliding down" warping operation will be discussed first.

In FIG. 4, region 420 may represent a region of an image or video frame stored in Image Signal Processor (ISP) memory. Region 420 may include, for example, one or more distorted images or frames, or a portion of one or more distorted images or frames, that may be divided into neighboring distorted tetragons, such as distorted tetragon 406. The size of region 420 may be configurable. To process distorted tetragon 406, a processing region 422 (which may also be referred to herein as a "window of interest") may be determined and copied from, for example ISP memory, to, for example, a local memory storage/buffer of the image warping and scaling accelerator. Processing region 422 may include at least the full width of distorted tetragon 406. In an embodiment, an intermediary buffer may be used to buffer at least a whole tetragon of the neighboring distorted tetragons, and this may include coordinates P0', P1', P2', and P3'. The size of processing region 422 may be configurable.

According to embodiments, processing may begin when processing region 422 is copied to the local memory of the accelerator. During processing of processing region 422, starting with the configured source address, which may initially be at the top left corner 424 of the processing region, input pixels of processing region 422 (and then prefetch region 432) may be read and output pixels may be determined based on one or more set configuration settings (e.g., scanning type, interpolation, type, performance setting, etc.). The pixels may be read at specified increments until the end of a line, and then read at a new line at a specified line increment. In embodiments, the locations and values of the output pixels may be determined as described with reference to FIGS. 2 and 3, and the output pixel data may be saved in ISP memory starting at the address set in the configured destination address setting, for example. In an embodiment, both the source address and destination address parameters may be in the form of byte-based addresses. As the ISP memory may allow unaligned pixel addresses, the input and output locations may be specified at the pixel grid. Source and destination strides may also be byte-based.

As can be seen in FIG. 4, processing region 422 may have a vertical (Y) dimension 426 and a horizontal (X) dimension 428. In the example shown in FIG. 4, the horizontal dimension 428 is wide enough to include the entire width of distorted tetragon 406; however, the vertical dimension 426 is not wide enough to include the entire height of distorted tetragon 406. Therefore, processing may include scanning downward in the direction of arrow 430. In an embodiment, this may be enabled by the accelerator local memory which may have built-in capability of sliding downwards in the source buffer. It may be observed as a window covering area of processing region 422 and prefetch region 432 that slides in the direction of arrow 430 as the processing progresses throughout the tetragon lines (i.e., rows). When an address representing an end of the processing region is reached, processing may continue at an address representing a leading pixel of a first line, or row, located immediately below the already-processed pixels. Processing may continue until an address is reached that signifies that the entire distorted tetragon 406 was processed. For example, in an embodiment, processing may continue until the maximum Y value of P2' or P3' (optionally plus a designated envelope length) is reached, as shown by arrow 434. The refreshing of the processing region 422 and the prefetch region 432 may be controlled by the accelerator on an as-needed basis. During processing, a designated source stride 438 may be used when reading the input pixels from the source buffer, and a designated destination stride (not shown) may be used when storing output pixels in the destination buffer. A stride is the address increment (e.g., in bytes) of one buffer line. As an example, for a pixel at an (x,y) position, the buffer address may be calculated as y*stride+x. In FIG. 4, NWAY 436 is also depicted. NWAY 436 represents a width of a memory word in pixels, which is the granularity of the access to the destination and source buffers. As an example, one access to the source buffer may provide NWAY pixels, and NWAY pixels are able to be stored to the destination buffer by means of one access. In an embodiment, the accelerator may support reading of a source buffer that is not continuously stored in memory, but consists of two parts having a same stride. This may be accomplished by "wrapping" using, for example, the configured source wrap address and source end address described above. When a configured source end address is reached, processing may continue at the source wrap address.

Another way to describe an interpolation procedure using "sliding down" mode may be as follows, according to an embodiment. This description refers to FIG. 3. From the P0' to P2' distance and/or the P1' to P3' distance, horizontal and vertical distances between output pixels may be determined (e.g., LeftStepX and LeftStepY, etc., as discussed above). P0' and P1' may be considered current starting and ending coordinates, respectively (e.g., CurrStart and CurrEnd). DeltaX and DeltaY values may be determined as a distance between CurrStart and CurrEnd divided by OXDim. Horizontal ("OXDim") output pixels may be interpolated starting from CurrStart and incrementing with DeltaX and DeltaY. As processing continues, the value of CurrStart may be incremented with LeftStepX and LeftStepY, and the value of CurrEnd may be similarly incremented. The determination of DeltaX and DeltaY, the determination of horizontal ("OXDim") output pixels, and the incrementing of CurrStart and CurrEnd may continue OYDim times. In summary, when sliding down, output pixels may be interpolated line by line starting from the top-left pixel (which may be known as a row-major access). This processing may be considered as two loops, where OYDim lines are each processed until OXDim output pixels are determined.

While FIG. 4 is a depiction of a "sliding down" scanning mode example of a warping operation, FIG. 5 is a depiction of a "sliding right" scanning mode example of a warping operation. In FIG. 5, region 520 may represent a region of an image or video frame stored in ISP memory. Region 520 may include, for example, one or more distorted images or frames, or a portion of one or more distorted images or frames, that may be divided into neighboring distorted tetragons, such as distorted tetragon 506. To process distorted tetragon 506, a processing region 522 (which may also be referred to herein as a "window of interest") may be determined and copied from, for example ISP memory, to, for example, the local memory storage of the image warping and scaling accelerator. Processing region 522 may include at least the full height of distorted tetragon 506. In an embodiment, an intermediary buffer may be used to buffer at least a whole tetragon of the neighboring distorted tetragons, and this may include coordinates P0', P1', P2', and P3'. The size of processing region 522 may be configurable.

According to embodiments, processing may begin when processing region 522 is copied to the local memory. During processing of processing region 522, starting with the configured source address, which may initially be at the top left corner 524 of the processing region, input pixels of processing region 522 (and then prefetch region 432) may be read and output pixels may be determined based on one or more set configuration settings (e.g., scanning type, interpolation, type, performance setting, etc.). The pixels may be read at specified increments until the end of a column, and then read at a new column at a specified increment. In embodiments, the output pixels may be determined as described with reference to FIGS. 2 and 3, and the output pixel data may be saved in ISP memory starting at the address set in the configured destination address setting, for example. In an embodiment, both the source address and destination address parameters may be in the form of byte-based addresses. As the ISP memory may allow unaligned pixel addresses, the input and output locations may be specified at the pixel grid. The source and destination strides may also be byte-based.

As can be seen in FIG. 5, processing region 522 may have a vertical (Y) dimension 526 and a horizontal (X) dimension 528. In the example shown in FIG. 5, the vertical dimension 526 is wide enough to include the entire height of distorted tetragon 506; however, the horizontal dimension 528 is not wide enough to include the entire width of distorted tetragon 506. Therefore, processing may include scanning right in the direction of arrow 530. In an embodiment, this may be enabled by the accelerator local memory which may have built-in capability of sliding rightwards in the source buffer. It may be observed as a window covering area of processing region 522 and prefetch region 532 that slides in the direction of arrow 530 as the processing progresses throughout the tetragon columns. In an embodiment, the data for one or more of the pixels to the right of the current processing region 522 (e.g., the pixels of window 532) may be autonomously pre-fetched prior to need. When an address representing an end of the processing region is reached, processing may continue at an address representing a leading pixel of a first column located to the right of the already-processed pixels. Processing may continue until an address is reached that signifies that the entire distorted tetragon 506 was processed. For example, in an embodiment, processing may continue until the maximum X value of P1' or P3' (optionally plus a designated envelope length) is reached, as shown by arrow 534. The refreshing of the processing region 522 and the prefetch region 532 may be controlled by the accelerator on an as-needed basis. During processing, a designated source stride 538 may be used when reading the input pixels, and a designated destination stride (not shown) may be used when storing output pixels. As described above, in an embodiment, the accelerator may support reading of a source buffer that is not continuously stored in memory, but consists of two parts having a same stride. This may be accomplished by "wrapping" using, for example, the configured source wrap address and source end address described above. When a configured source end address is reached, processing may continue at the source wrap address.

Figure 6:
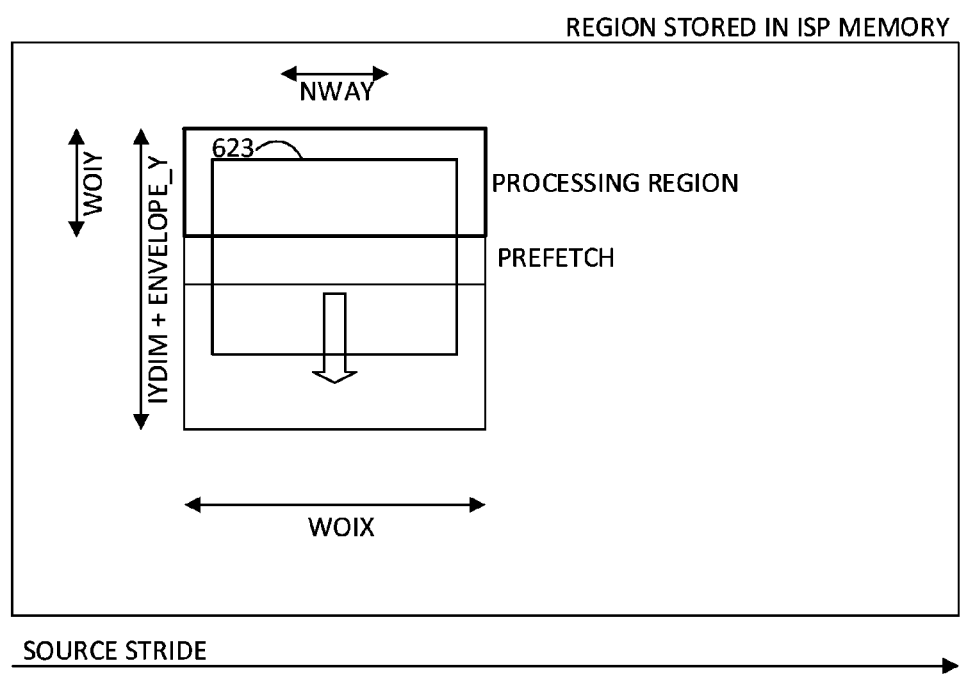
FIG. 6 is a depiction of a "sliding down" scanning mode example of a resolution scaling operation, according to an embodiment.
Figure 7:
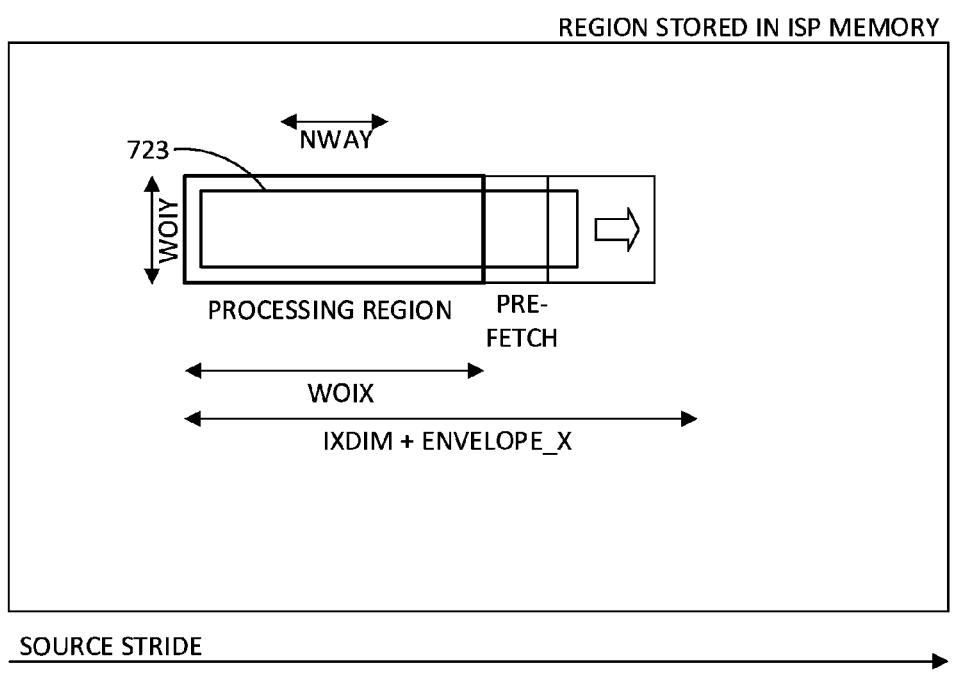
FIG. 7 is a depiction of a "sliding to the right" scanning mode example of a resolution scaling operation, according to an embodiment.

The accelerator may also be used for resolution scaling operations. FIGS. 6 and 7 depict resolution scaling operation examples. FIG. 6 is a depiction of a "sliding down" scanning mode example of a resolution scaling operation, according to an embodiment, and FIG. 7 is a depiction of a "sliding to the right" scanning mode example of a resolution scaling operation, according to an embodiment. Which scanning mode is used may depend on the shape and/or size (e.g., height and width) of the shape being processed. The examples of FIGS. 6 and 7 are similar to the above-discussed examples of FIGS. 4 and 5, respectively, including the use of most configuration settings, except that the input image is rectangular and divided into neighboring rectangles (such as rectangles 623 and 723, respectively, instead of tetragons. Scaling is controlled based on the fractional distances between output pixels (dX and dY), with a rectangular grid assumed by default. Distances dX and dY may be configurable as discussed earlier herein. Distance dX may be used to determine a horizontal scaling ratio (rX=n/dX), and distance dY may be used to determine a vertical scaling ratio (rY=n/dY), where n is a design constant that may be configurable. No coordinates P0', P1', P2', P3' are necessary for scaling.

Figure 8:
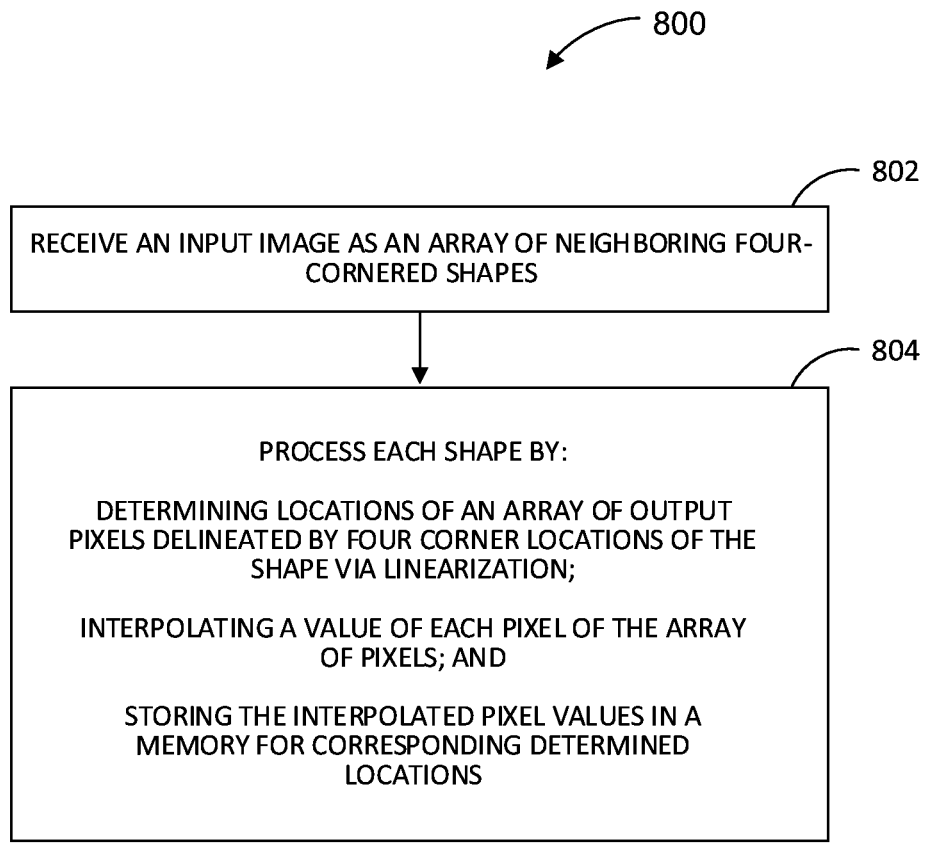
FIG. 8 is an example flow chart depicting a pixel-based warping or scaling operation, according to an embodiment.

FIG. 8 is an example flow chart depicting a pixel-based warping or scaling operation 800, according to an embodiment, from the perspective of an image warping and scaling accelerator. An input image is received as an array of neighboring four-cornered shapes (802). Each shape is processed (804) by: determining locations of an array of output pixels delineated by four corner locations of the shape via linearization; interpolating a value of each pixel of the array of output pixels; and storing the interpolated pixel values in a memory for corresponding determined locations.

Figure 9:
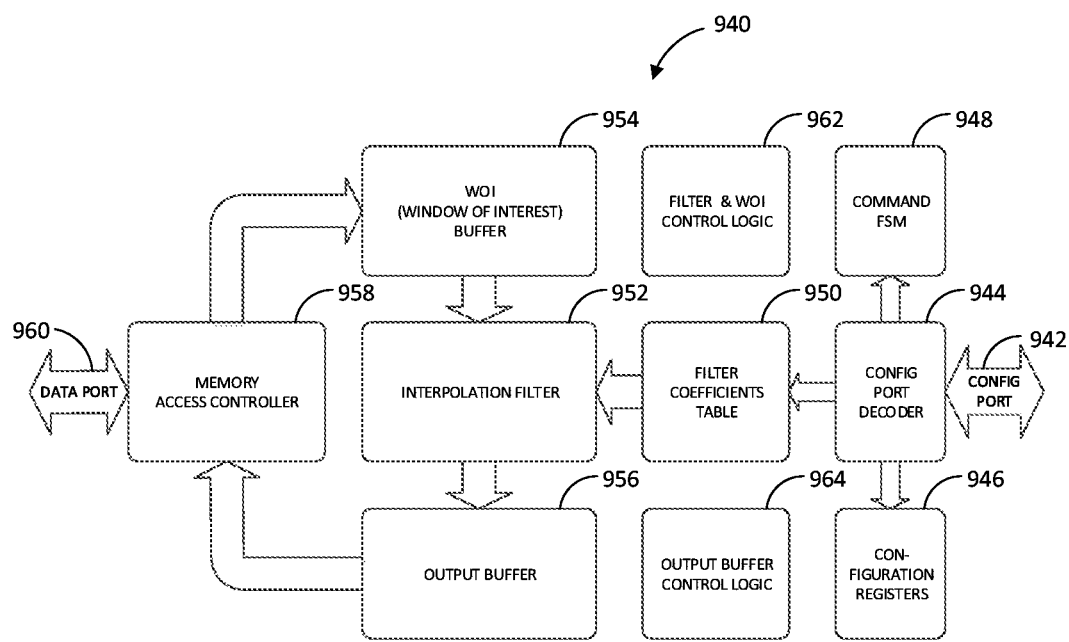
FIG. 9 is a block diagram showing an example component architecture of a warping and scaling accelerator, according to an embodiment.

FIG. 9 is a block diagram showing an example component architecture of a warping and scaling accelerator 940, according to an embodiment. Accelerator 940 may include, for example, a configuration port 942, a configuration port decoder 944, configuration registers 946, a command finite state machine (FSM) 948, and a filter coefficients table 950. Configuration port 942 is a port through which configuration settings such as those described herein may be provided to accelerator 940. Configuration settings may be obtained in various ways (e.g., by a user via a user interface, via download from a file or a memory, etc.). Configuration port decoder 944 may decode the configuration settings and provide one or more of the configuration settings to configuration registers 946 for storage, to command FSM 948 for interpretation, and/or to filter coefficients table 950. More specifically, configuration port decoder 944 may decode the access, or request, on configuration port 942 and determine where the request should be delegated. For example, a request may be delegated to configuration registers 946 for reading or writing one or more configuration setting values, to filter coefficients table 950 for reading or writing of one or more values of one or more coefficients for use in interpolation (e.g., bi-cubic, polyphase filter, or LUT), and/or to command FSM 948 for requesting processing of a block (e.g., tetragon or rectangle). In an embodiment, command FSM 948 may send an acknowledgment to the requestor via configuration port 942 (e.g., upon completion of a request). Command FSM 948 may also control a top-level state of accelerator 940 (e.g., BUSY when processing a command, IDLE when waiting for a command to be issued, etc.) Accelerator 940 may also include an interpolation filter 952, a window of interest buffer 954, an output buffer 956, a memory access controller 958, and a data port 960. The window of interest buffer 954 and interpolation filter 952 may be controlled via filter and window of interest control logic 962, and the output buffer may be controlled via output buffer control logic 964. In operation, memory access controller 958 provides, for example, from ISP memory through data port 960, data representing the pixels of the window of interest for processing. The data is provided by memory access controller 958 to the window of interest buffer 954. The data is then processed through interpolation filter 952 based on configuration settings and/ or coefficients provided to interpolation filter 952 from filter coefficients table 950. The processing of the data (e.g., warping and/or scaling) may be as described earlier herein. Interpolated output pixels are provided by interpolation filter 952 to output buffer 956. The output pixels are provided from output buffer 956 to memory access controller 958 for writing to, for example, ISP memory via data port 960. In embodiments, accelerator 940 may be designed in digital logic and may be implemented in silicon.

In embodiments, such as those described above, both pixel locations and pixel values are interpolated. In an example embodiment, first a location of a pixel may be interpolated, then its value may be interpolated, then the location and value of a next pixel may be interpolated, and so on. In embodiments, the processing of pixels may depend on configured performance point settings as described earlier herein. A performance point setting may define how many pixels per clock cycle are produced. For example, if a 1×1 performance point is configured, the location and value of each pixel may be processed one pixel at a time, as described earlier in this paragraph. For 1×2 performance, the locations of two pixels vertically may be determined in parallel, and their values may be determined in parallel. For 2×1 performance, the locations of two pixels horizontally may be determined in parallel, and their values may be determined in parallel. For 2×2 performance, the locations of four pixels of a 2×2 block may be determined in parallel, and their values may be determined in parallel.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 10:
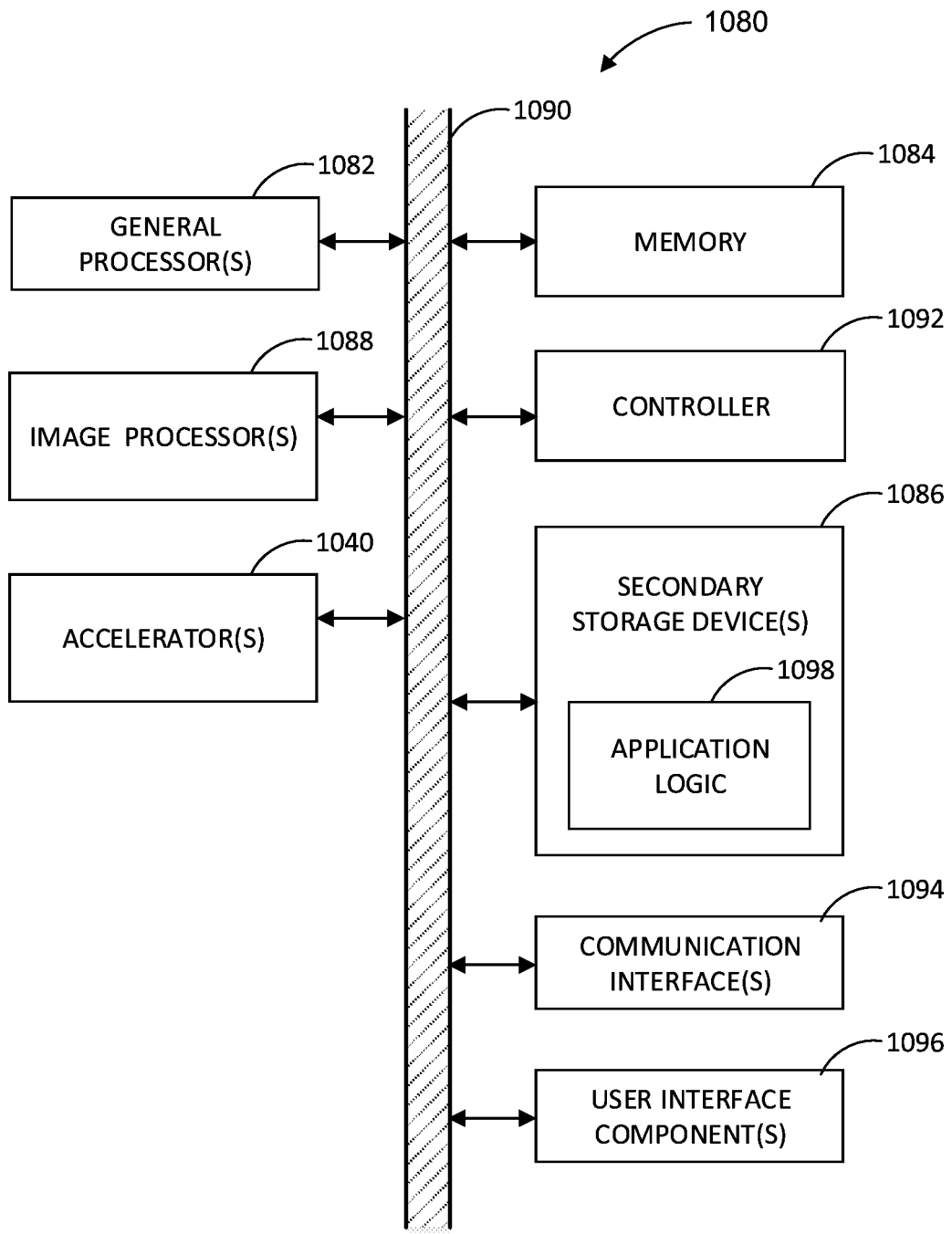
FIG. 10 is a block diagram of an example computing device, according to an embodiment.

As stated above, in embodiments, some or all of the processing described herein may be implemented as hardware, software, and/or firmware. Such embodiments may be illustrated in the context of an example computing system 1080 as shown in FIG. 10. Computing system 1080 may include one or more central processing unit(s) (CPU), such as one or more general processors 1082, connected to memory 1084, one or more secondary storage devices 1086, and one or more image processors 1088 by a link 1090 or similar mechanism. In an embodiment, image processor(s) 1088 (e.g., a graphics core) may be integrated with general processor(s) 1082 (e.g., a processor core). The general processor(s) 1082 and/or image processor(s) 1088 may include one or more logic units for carrying out the methods described herein. In embodiments, other logic units may also be present. One of ordinary skill in the art would recognize that the functions of the logic units may be executed by a single logic unit, or any number of logic units. Memory 1084 may be controlled by one or more controller(s) 1092. In an embodiment, the controller(s) 1092 may be embedded in general processor(s) 1082 or image processor(s) 1088. When used as a memory controller, memory 1084 may be connected to the processor via the memory controller. Computing system 1080 may optionally include communication interface(s) 1094 and/or user interface components 1096. The communication interface(s) 1094 may be implemented in hardware or a combination of hardware and software, and may provide a wired or wireless network interface to a network. The user interface components 1096 may include, for example, a touchscreen, a display, one or more user input components (e.g., a keyboard, a mouse, etc.), a speaker, or the like, or any combination thereof. Images and/or video processed via the methods described herein may be displayed on one or more user interface components. The one or more secondary storage devices 1086 may be, for example, one or more hard drives or the like, and may store logic 1098 (e.g., application logic) to be executed by one or more controller(s) 1092, image processor(s) 1088 and/or general processor(s) 1082. In an embodiment, general processor(s) 1082 and/or image processor(s) 1088 may be microprocessors, and logic 1098 may be stored or loaded into memory 1084 for execution by general processor(s) 1082 and/or image processor(s) 1088 to provide the functions described herein. Image processor(s) 1088 may include a separate memory (not shown) for image processing. Computing system 1080 may also include one or more accelerator units 1040, with functionality as described herein. The accelerator unit(s) 1040 may be separate from image processor(s) 1088 (as shown in FIG. 9), or integrated with image processor(s) 1088. Note that while not shown, computing system 1080 may include additional components.

Figure 11:
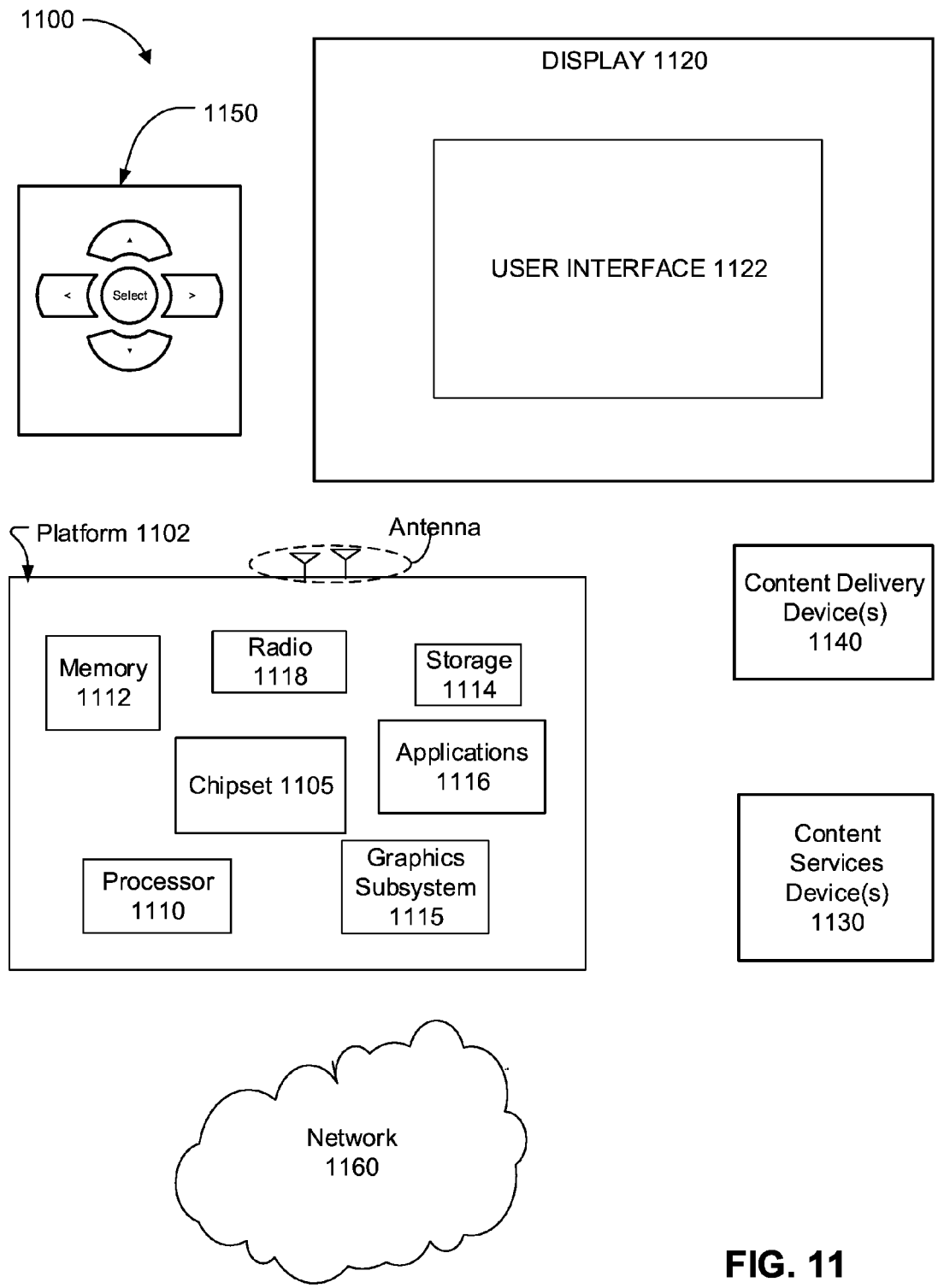
FIG. 11 illustrates an example information system in which an embodiment may be implemented.

The technology described above may be a part of a larger information system. FIG. 11 illustrates such an embodiment, as a system 1100. In embodiments, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1100 comprises a platform 1102 coupled with a display 1120. Platform 1102 may receive content from a content device such as content services device(s) 1130 or content delivery device(s) 1140 or other similar content sources. A navigation controller 1150 comprising one or more navigation features may be used to interact with, for example, platform 1102 and/or display 1120. Each of these components is described in more detail below.

In embodiments, platform 1102 may comprise any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1110 may comprise dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1114 may comprise technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 could be integrated into processor 1110 or chipset 1105. Graphics subsystem 1115 could be a stand-alone card communicatively coupled with chipset 1105.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1118 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 1118 may operate in accordance with one or more applicable standards in any version.

In embodiments, display 1120 may comprise any television type monitor or display. Display 1120 may comprise, for example, a computer display screen, touch screen display, video monitor, television-like device, and/or a television. Display 1120 may be digital and/or analog. In embodiments, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In embodiments, content services device(s) 1130 may be hosted by any national, international and/or independent service and thus accessible to platform 1102 via the Internet, for example. Content services device(s) 1130 may be coupled with platform 1102 and/or to display 1120. Platform 1102 and/or content services device(s) 1130 may be coupled with a network 1160 to communicate (e.g., send and/or receive) media information to and from network 1160. Content delivery device(s) 1140 also may be coupled with platform 1102 and/or to display 1120.

In embodiments, content services device(s) 1130 may comprise a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 receives content such as cable television programming including media information, digital information, and/or other content. Examples of content providers may include any cable or satellite television or radio or Internet content providers. The provided examples are not meant to limit embodiments of this disclosure.

In embodiments, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 1150 may be echoed on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but integrated into platform 1102 and/or display 1120. Embodiments, however, are not limited to the elements or in the context shown or described herein.

In embodiments, drivers (not shown) may comprise technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 when the platform is turned "off." In addition, chipset 1105 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the embodiments discussed in this disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
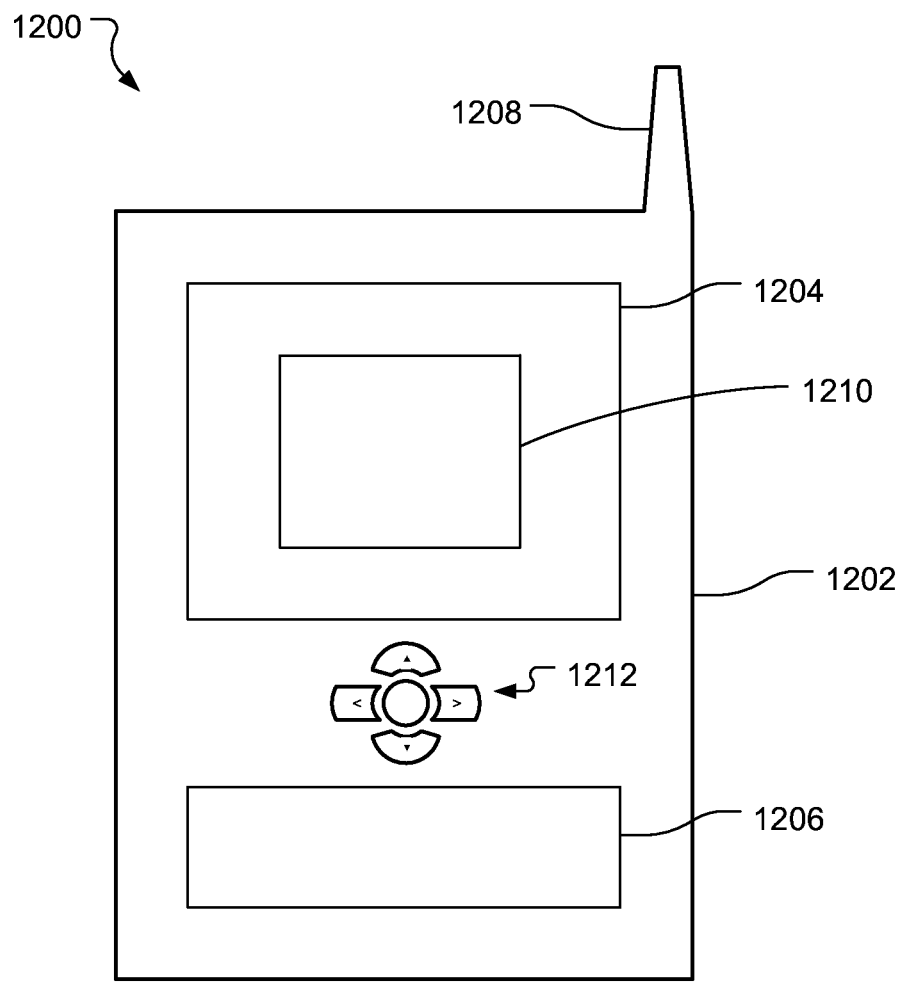
FIG. 12 illustrates an example mobile information device in which an embodiment may be implemented.

As described above, system 1100 may be embodied in varying physical styles or form factors. FIG. 12 illustrates embodiments of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may comprise a housing 1202, a display 1204, an input/output (I/O) device 1206, and an antenna 1208. Device 1200 also may comprise navigation features 1212. Display 1204 may comprise any suitable display unit for displaying information 1210 appropriate for a mobile computing device. I/O device 1206 may comprise any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition devices and software, and so forth. Information also may be entered into device 1200 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Technologies disclosed herein may provide pixel-based image warping and scaling acceleration with efficiency in performance, power, area, flexibility, and implementation. The programmability of the described solutions may allow for the fine tuning of execution performance. For example, the configurability of interpolation mode may be advantageous depending on the desired performance and/or quality (e.g., using bi-linear interpolation may result in higher performance throughput while using bi-cubic interpolation may result in better quality). As another example, the performance may be configurable such that one to many output pixels can be produced per output clock, depending on the interpolation used. Micro-architecture and clock gating techniques may allow for low power consumption. In addition, a modular design may allow ease of changeability. Many other advantages may also be contemplated. The particular examples and scenarios used in this document are for ease of understanding and are not to be limiting. Features described herein may be used in many other contexts, as would be understood by one of ordinary skill in the art.

In addition to image warping and scaling, the customizable image processing block described herein may achieve geometric distortion and/or chromatic aberration correction, digital image and video stabilization, up to six axis movement compensation (e.g., translation, rotation, tilt, zoom in/out, etc.), digital zoom (in/out), image convolution with any separable programmable filter (e.g., 2×2, 3×3, 4×4, etc.). Look-up table (LUT) functionality may also be supported.

The following examples pertain to further embodiments.

Example 1 may include an image processing system, comprising: a memory; and an accelerator unit communicatively coupled with the memory, wherein the accelerator unit is to, based on configuration settings: receive, from the memory, at least a portion of an input image as an array of neighboring four-cornered shapes; and process each shape by: determining locations of an array of output pixels delineated by four corner locations of the shape via linearization; interpolating a value of each pixel of the array of output pixels; and storing the interpolated pixel values in the memory for corresponding determined locations.

Example 2 may include the subject matter of Example 1, wherein the array of neighboring four-cornered shapes includes an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the array of output pixels are determined based on the four coordinates, and wherein the interpolated pixel values represent a warped output image.

Example 3 may include the subject matter of Example 1, wherein the array of neighboring four-cornered shapes includes an array of neighboring rectangles, and wherein the interpolated pixel values represent a scaled output image based on fractional distances between output pixels.

Example 4 may include the subject matter of any of Examples 1-3, wherein the processing of each shape includes: determining at least a portion of the shape to initially scan, wherein the at least a portion of the shape is defined by a window of interest; and scanning the shape by processing pixels within the window of interest sequentially by row, wherein when a first address is reached, scanning is continued at a second address representing a first pixel of a first row below already-processed pixels.

Example 5 may include the subject matter of any of Examples 1-3, wherein the processing of each shape includes: determining at least a portion of the shape to initially scan, wherein the at least a portion of the shape is defined by a window of interest; and scanning the shape by processing pixels within the window of interest sequentially by column, wherein when a first address is reached, scanning is continued at a second address representing a first pixel of a first column to the right of already-processed pixels.

Example 6 may include the subject matter of any of Examples 1-5, wherein the configuration settings include one or more of: a processing mode; a scanning type; an interpolation type; a performance setting; a bit precision setting; block dimension settings; fractional distances between output pixels for scaling; a source address of start of input region; an end address from which to wrap a scan; a wrap address to which to wrap the scan; an input stride setting for reading input pixels; a destination address of start of output region; or an output stride setting for storing output pixels.

Example 7 may include the subject matter of Example 6, wherein the processing mode includes one of a scaling mode or a re-shaping mode.

Example 8 may include the subject matter of Example 6 or Example 7, wherein the scanning type includes one of a slide down scan or a slide right scan.

Example 9 may include the subject matter of any of Examples 6-8, wherein the interpolation type includes one of nearest neighbor interpolation, bi-linear interpolation, bi-cubic interpolation; or a look-up table.

Example 10 may include the subject matter of any of Examples 6-9, wherein the interpolation type includes a poly-phase filter configurable in filter size and filter coefficients.

Example 11 may include the subject matter of any of Examples 6-10, wherein the performance setting relates to a number of output pixels per clock cycle and includes one of: one pixel per clock cycle (1×1); two pixels horizontally and one pixel vertically per clock cycle (2×1); one pixel horizontally and two pixels vertically per clock cycle (1×2); or two pixels horizontally and two pixels vertically per clock cycle (2×2).

In Example 12, any of Examples 1-11 may include: at least one processor; a communication interface communicatively coupled with the at least one processor and a network; a user interface including a navigation device and display, the user interface communicatively coupled with the at least one processor; and storage that stores application logic, the storage communicatively coupled with the at least one processor, wherein the at least one processor is to load and execute the application logic, wherein the execution of the application logic includes presenting graphics via the user interface.

Example 13 may include at least one computer program product for image processing, including at least one computer readable medium having computer program logic stored therein, the computer program logic including: logic to receive at least a portion of an input image as an array of neighboring four-cornered shapes; and logic to process each shape, including: logic to determine locations of an array of output pixels delineated by four corner locations of the shape via linearization; logic to interpolate a value of each pixel of the array of output pixels; and logic to store the interpolated pixel values for corresponding determined locations.

Example 14 may include the subject matter of Example 13, wherein the logic to receive the input image includes logic to receive a distorted input image as an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the array of output pixels are determined based on the four coordinates, and wherein the interpolated pixel values represent a warped output image.

Example 15 may include the subject matter of Example 13, wherein the logic to receive the input image includes logic to receive the input image as an array of neighboring rectangles, and wherein the interpolated pixel values represent a scaled output image based on fractional distances between output pixels.

Example 16 may include the subject matter of any of Examples 13-15, wherein the logic to process each shape includes logic to: determine at least a portion of the shape to initially scan, wherein the at least a portion of the shape is defined by a window of interest; and scan the shape by processing pixels within the window of interest sequentially by row, wherein when a first address is reached, scanning is continued at a second address representing a first pixel of a first row below already-processed pixels.

Example 17 may include the subject matter of any of Examples 13-15, wherein the logic to process each shape includes logic to: determine at least a portion of the shape to initially scan, wherein the at least a portion of the shape is defined by a window of interest; and scan the shape by processing pixels within the window of interest sequentially by column, wherein when a first address is reached, scanning is continued at a second address representing a first pixel of a first column to the right of already-processed pixels.

Example 18 may include an apparatus for image processing, comprising: means for receiving at least a portion of an input image as an array of neighboring four-cornered shapes; and means for processing each shape, including: means for determining locations of an array of output pixels delineated by four corner locations of the shape via linearization; means for interpolating a value of each pixel of the array of output pixels; and means for storing the interpolated pixel values for corresponding determined locations.

Example 19 may include the subject matter of Example 18, wherein the means for receiving the input image includes means for receiving a distorted input image as an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the array of output pixels are determined based on the four coordinates, and wherein the interpolated pixel values represent a warped output image.

Example 20 may include the subject matter of Example 18, wherein the means for receiving the input image includes means for receiving the input image as an array of neighboring rectangles, and wherein the interpolated pixel values represent a scaled output image based on fractional distances between output pixels.

Example 21 may include the subject matter of any of Examples 18-20, wherein the means for processing each shape includes means for: determining at least a portion of the shape to initially scan, wherein the at least a portion of the shape is defined by a window of interest; and scanning the shape by processing pixels within the window of interest sequentially by row, wherein when a first address is reached, scanning is continued at a second address representing a first pixel of a first row below already-processed pixels.

Example 22 may include the subject matter of any of Examples 18-20, wherein the means for processing each shape includes means for: determining at least a portion of the shape to initially scan, wherein the at least a portion of the shape is defined by a window of interest; and scanning the shape by processing pixels within the window of interest sequentially by column, wherein when a first address is reached, scanning is continued at a second address representing a first pixel of a first column to the right of already-processed pixels.

Example 23 may include a method of image processing, comprising: receiving, from a memory and by an accelerator unit, at least a portion of an input image as an array of neighboring four-cornered shapes; and processing, by the accelerator unit, each shape, by: determining locations of an array of output pixels delineated by four corner locations of the shape via linearization; interpolating a value of each pixel of the array of output pixels; and storing the interpolated pixel values in the memory for corresponding determined locations.

Example 24 may include the subject matter of Example 23, wherein the receiving the input image includes receiving a distorted input image as an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the array of output pixels are determined based on the four coordinates, and wherein the interpolated pixel values represent a warped output image.

Example 25 may include the subject matter of Example 23, wherein the receiving the input image includes receiving the input image as an array of neighboring rectangles, and wherein the interpolated pixel values represent a scaled output image based on fractional distances between output pixels.

Example 26 may include the subject matter of any of Examples 23-25, wherein the processing each shape includes: determining at least a portion of the shape to initially scan, wherein the at least a portion of the shape is defined by a window of interest; and scanning the shape by processing pixels within the window of interest sequentially by row, wherein when a first address is reached, scanning is continued at a second address representing a first pixel of a first row below already-processed pixels.

Example 27 may include the subject matter of any of Examples 23-25, wherein the processing each shape includes: determining at least a portion of the shape to initially scan, wherein the at least a portion of the shape is defined by a window of interest; and scanning the shape by processing pixels within the window of interest sequentially by column, wherein when a first address is reached, scanning is continued at a second address representing a first pixel of a first column to the right of already-processed pixels.

Example 28 may include at least one machine readable medium comprising a plurality of instructions that in response to being executed on a computing device, cause the computing device to carry out a method according to any one of Examples 23-27.

Example 29 may include an apparatus configured to perform the method of any one of Examples 23-27.

Example 30 may include a computer system to perform the method of any one of Examples 23-27.

Example 31 may include a machine to perform the method of any one of Examples 23-27.

Example 32 may include an apparatus comprising means for performing the method of any one of Examples 23-27.

Example 33 may include a computing device comprising memory and a chipset configured to perform the method of any one of Examples 23-27.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons of ordinary skill in the relevant art that various changes in form and detail may be made therein without departing from the scope of the methods and systems disclosed herein. Thus, the breadth and scope of the claims should not be limited by any of the exemplary embodiments disclosed herein.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

What is claimed is:

1. An image processing system, comprising:
   a memory to store a region of an input image; and
   a hardware accelerator unit communicatively coupled with the memory, wherein the hardware accelerator unit comprises a hardware accelerator unit local memory buffer and wherein the hardware accelerator unit is to, based on configuration settings:
      receive, from the memory to the hardware accelerator unit local memory buffer, only a portion of the region of the input image comprising a portion of a four-cornered shape of the input image, wherein the portion of the region comprises an entirety of the four-cornered shape in one direction and only a portion of the four-cornered shape in a perpendicular direction;
      process, only after receiving the entire portion of the region of the input image into the hardware accelerator unit local memory buffer, the portion of the four-cornered shape by:
         determining locations of output pixels corresponding to the portion of the four-cornered shape;
         interpolating a value of each of the output pixels; and
         storing the interpolated pixel values in the memory to generate a portion of an output image;
      prefetch, during processing of the portion of the four-cornered shape, a second portion of the region of the input image comprising a second portion of the four-cornered shape; and
      process the second portion of the four-cornered shape to generate a second portion of the output image.

2. The image processing system of claim 1, wherein the four-cornered shape comprises one of an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the output pixels are determined based on the four coordinates, and wherein the interpolated pixel values represent a warped output image.

3. The image processing system of claim 1, wherein the four-cornered shape comprises one of an array of neighboring rectangles, and wherein the interpolated pixel values represent a scaled output image based on fractional distances between output pixels.

4. The image processing system of claim 1, wherein the processing of the portion of the region of the input image includes:
   scanning the portion of the region of the input image by processing pixels within the portion of the region of the input image sequentially by row, wherein when a first address is reached, scanning is continued at a second address representing a first pixel of a first row below already-processed pixels, wherein the portion of the region comprises the entirety of the four-cornered shape in a horizontal direction.

5. The image processing system of claim 1, wherein the processing of the portion of the region of the input image includes:
   scanning the portion of the region of the input image by processing pixels within the portion of the region of the input image sequentially by column, wherein when a first address is reached, scanning is continued at a second address representing a first pixel of a first column to the right of already-processed pixels, wherein the portion of the region comprises the entirety of the four-cornered shape in a vertical direction.

6. The image processing system of claim 1, wherein the configuration settings include a processing mode, a scanning type, an interpolation type, a performance setting, a bit precision setting, block dimension settings, a source address of start of input region, an end address from which to wrap a scan, a wrap address to which to wrap the scan, an input stride setting for reading input pixels, a destination address of start of output region, and an output stride setting for storing output pixels.

7. The image processing system of claim 6, wherein the processing mode includes one of a scaling mode or a re-shaping mode.

8. The image processing system of claim 6, wherein the scanning type includes one of a slide down scan or a slide right scan.

9. The image processing system of claim 6, wherein the interpolation type includes one of nearest neighbor interpolation, bi-linear interpolation, bi-cubic interpolation, or a look-up table.

10. The image processing system of claim 6, wherein the interpolation type includes a poly-phase filter configurable in filter size and filter coefficients.

11. The image processing system of claim 6, wherein the performance setting relates to a number of output pixels per clock cycle and includes one of:
    one pixel per clock cycle (1×1);
    two pixels horizontally and one pixel vertically per clock cycle (2×1);
    one pixel horizontally and two pixels vertically per clock cycle (1×2); or
    two pixels horizontally and two pixels vertically per clock cycle (2×2).

12. The image processing system of claim 1, further comprising:
    at least one processor;
    a communication interface communicatively coupled with the at least one processor and a network;
    a user interface including a navigation device and display, the user interface communicatively coupled with the at least one processor; and
    storage that stores application logic, the storage communicatively coupled with the at least one processor, wherein the at least one processor is to load and execute the application logic, wherein the execution of the application logic includes presenting graphics via the user interface.

13. At least one non-transitory computer program product for image processing, including at least one computer readable medium having computer program logic stored therein, the computer program logic including:
logic to receive only a portion of a region an input image comprising a portion of a four-cornered shape of the input image, wherein the portion of the region comprises an entirety of the four-cornered shape in one direction and only a portion of the four-cornered shape in a perpendicular direction;
logic to process, only after receiving the entire portion of the region of the input image into the hardware accelerator unit local memory buffer, the portion of the four-cornered shape, including:
logic to determine locations of output pixels corresponding to the portion of the four-cornered shape;
logic to interpolate a value of each of the output pixels;
logic to store the interpolated pixel values to generate a portion of an output image;
logic to prefetch, during processing of the portion of the four-cornered shape, a second portion of the region of the input image comprising a second portion of the four-cornered shape; and
logic to process the second portion of the four-cornered shape to generate a second portion of the output image.

14. The at least one computer program product of claim 13, wherein the four-cornered shape comprises one of an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the output pixels are determined based on the four coordinates, and wherein the interpolated pixel values represent a warped output image.

15. The at least one computer program product of claim 13, wherein the four-cornered shape comprises one of an array of neighboring rectangles, and wherein the interpolated pixel values represent a scaled output image based on fractional distances between output pixels.

16. The at least one computer program product of claim 13, wherein the logic to process the portion of the region of the input image includes logic to:
scan the portion of the region of the input image by processing pixels within the portion of the region of the input image sequentially by row, wherein when a first address is reached, scanning is continued at a second address representing a first pixel of a first row below already-processed pixels, wherein the portion of the region comprises the entirety of the four-cornered shape in a horizontal direction.

17. The at least one computer program product of claim 13, wherein the logic to process the portion of the region of the input image includes logic to:
scan the portion of the region of the input image by processing pixels within the portion of the region of the input image sequentially by column, wherein when a first address is reached, scanning is continued at a second address representing a first pixel of a first column to the right of already-processed pixels, wherein the portion of the region comprises the entirety of the four-cornered shape in a vertical direction.

18. A method of image processing, comprising:
receiving, from a memory and by an accelerator unit, only a portion of a region of an input image comprising a portion of a four-cornered shape of the input image, wherein the portion of the region comprises an entirety of the four-cornered shape in one direction and only a portion of the four-cornered shape in a perpendicular direction;
processing, by the accelerator unit and only after receiving the entire portion of the region of the input image into the hardware accelerator unit local memory buffer, the portion of the four-cornered shape by:
determining locations of output pixels corresponding to the portion of the four-cornered shape;
interpolating a value of each of the output pixels; and
storing the interpolated pixel values in the memory to generate a portion of an output image;
prefetching, during processing of the portion of the four-cornered shape, a second portion of the region of the input image comprising a second portion of the four-cornered shape; and
processing the second portion of the four-cornered shape to generate a second portion of the output image.

19. The method of claim 18, wherein the four-cornered shape comprises one of an array of neighboring distorted tetragons that approximate distortion of the input image, wherein each distorted tetragon is defined by four coordinates wherein a location of at least one of the four coordinates corresponds with a location of a corner of the distorted tetragon, wherein the locations of the of output pixels are determined based on the four coordinates, and wherein the interpolated pixel values represent a warped output image.

20. The method of claim 18, wherein the receiving the four-cornered shape comprises one of an array of neighboring rectangles, and wherein the interpolated pixel values represent a scaled output image based on fractional distances between output pixels.

21. The method of claim 18, wherein the processing of the portion of the region of the input image includes:
scanning the portion of the region of the input image by processing pixels within the portion of the region of the input image sequentially by row, wherein when a first address is reached, scanning is continued at a second address representing a first pixel of a first row below already-processed pixels, wherein the portion of the region comprises the entirety of the four-cornered shape in a horizontal direction.

22. The method of claim 18, wherein the processing of the portion of the region of the input image includes:
scanning the portion of the region of the input image by processing pixels within the portion of the region of the input image sequentially by column, wherein when a first address is reached, scanning is continued at a second address representing a first pixel of a first column to the right of already-processed pixels, wherein the portion of the region comprises the entirety of the four-cornered shape in a vertical direction.

* * * * *